United States Patent [19]
Arai et al.

[11] 3,826,541
[45] July 30, 1974

[54] VEHICLE BRAKE SYSTEMS USING SKID CONTROL DEVICES

[75] Inventors: Hiroshi Arai; Jun Ota, both of Toyota, Japan

[73] Assignee: Toyota Jidosha Kogyo Kabushiki Kaisha, Toyota-shi, Aichi-ken, Japan

[22] Filed: Nov. 2, 1972

[21] Appl. No.: 303,142

Related U.S. Application Data
[62] Division of Ser. No. 137,858, April 27, 1971, abandoned.

[30] Foreign Application Priority Data
May 1, 1970  Japan.............................. 45-36802

[52] U.S. Cl.............................. 303/21 F, 303/10
[51] Int. Cl.............................................. B60t 8/00
[58] Field of Search ........ 188/181; 303/6 R, 10, 20, 303/21, 61, 63, 68

[56] References Cited
UNITED STATES PATENTS

| | | | |
|---|---|---|---|
| 3,256,046 | 6/1966 | Cripe | 303/21 F |
| 3,495,880 | 2/1970 | Gratsch | 303/21 F |
| 3,536,363 | 10/1968 | Ravenel | 303/21 F |
| 3,549,212 | 12/1970 | Leiber | 303/21 F |
| 3,703,946 | 11/1972 | Ondrasik | 303/21 F X |

*Primary Examiner*—Trygve M. Blix
*Assistant Examiner*—Stephen G. Kunin
*Attorney, Agent, or Firm*—Toren & McGeady

[57] ABSTRACT

In the disclosed brake system, a control circuit that responds to deceleration of a wheel actuates an oil pressure modulator when the control circuit determines the wheel is likely to slip or skid. The oil pressure modulator then eases the braking pressure in the wheels' brake cylinder. A switch responding to effort applied to the brake pedal enables the control circuit only when the brake pedal is actually depressed hard enough to try to stop the vehicle. The switch disables the control circuit at other times. The switch prevents the circuit from easing the brake pressure in response to rapid wheel decelerations that have nothing to do with braking, such as decelerations due to downward shifting of gears.

12 Claims, 4 Drawing Figures

INVENTORS
HIROSHI ARAI
BY JUN OTA
Toren and McGeady
ATTORNEYS

VEHICLE BRAKE SYSTEMS USING SKID CONTROL DEVICES

This is a division of application Ser. No. 137,858 filed Apr. 27, 1971 now abandoned.

REFERENCE TO COPENDING APPLICATIONS

This application refers to the subject matter disclosed in the applications of Takeshi Ochiai, Ser. Nos. 109,461 and 109,465, both filed on Jan. 25, 1971, respectively entitled SKID CONTROL SYSTEM FOR VEHICLES and SKID CONTROL SYSTEM, both assigned to the same assignee as this application and both abandoned in favor of continuation-in-part application Ser. No. 270,584 (T201) assigned to the same assignee as this application. The contents of these applications are herewith made part of this application as if completely recited herein.

BACKGROUND OF THE INVENTION

This invention relates generally to brake systems, and particularly to brake systems employing skid control devices for preventing the serious consequences that may result from wheel lock.

When the brakes of a vehicle such as an automobile are applied forcibly while the vehicle is traveling, the frictional force of the brake shoes may become greater than the frictional force between the wheels and the road surface. This may cause the wheels to lock and result in skidding, loss of control, irregular turning or similar undesirable effects. In order to avoid this, skid control devices, such as those described in the beforementioned applications, have been developed. In such skid control devices a wheel lock detecting unit responds to the rotation of the vehicle's wheels to determine conditions when the wheels are locking or likely to become locked. The detecting unit issues brake pressure releasing signals to an oil pressure modulating unit that modifies the pressure applied to a wheel brake cylinder by the brake pedal and the master cylinder.

In known skid control devices an energy source or an operating source energizes the lock detecting unit as long as the ignition is on. Thus the unit is continuously sensing conditions such as the variations in the rotational speed of the wheels, and more particularly the changes in the wheel deceleration or wheel slip ratio. Whenever the detector senses a condition indicating that the wheels are locking or are likely to lock the detecting unit applies its signal to the oil pressure modulator. Thus, whenever a potential skid condition is detected the oil pressure modulator eases the pressure produced in the brake line connecting the master cylinder operated by the brake pedal and the wheel cylinders. The effective wheel braking pressure is reduced under these circumstances. Thus the wheels are again permitted to rotate whenever these conditions occur.

After elapse of an appropriate period of time the detector allows the modulator to stop easing the pressure. The full pressure exerted by the brake pedal to the master cylinder is then again applied to the wheel brake cylinder. Full braking then resumes.

The modulator's easing of pressure prevents the vehicle from skidding. In general, in skid control devices of this type the lock detecting unit determines the condition when wheels may lock on the basis of changes in wheel deceleration; for example, it may interpret potential wheel lock when the deceleration exceeds a given deceleration.

However, sudden wheel decelerations or sudden changes in wheel deceleration occur not only when an operator applies his brakes, such as in an emergency, but in many other cases. For example, such changes occur when an operator, after starting a stationary car on a slippery frozen road or on a gravel road, or on a snow covered road, steps on the accelerator pedal hard enough to make the wheels slip or idle, and then release the accelerator pedal suddenly. Such release produces sudden deceleration of the wheels. This sudden deceleration may also occur when gears are shifted from high speed to normal speed.

All these effects produce substantial wheel deceleration with little gain or loss in the speed of the vehicle. The lock detecting unit, of course, cannot distinguish between this type of deceleration and the type produced by applying the brakes. It therefore falsely senses that the wheels are locking or likely to lock as if the operator were jamming on the brakes on a slippery road. The lock detecting unit then causes the oil pressure modulator to decrease the pressure in the wheel cylinders so that normal braking operation is impossible for a predetermined period.

The fact that normal depression of the brake pedal does not serve to brake the wheels when they are running idle may cause momentary mental anxiety to vehicle operators. In systems wherein the actual wheel speed is compared to a reference wheel speed which declines at a predetermined deceleration, the time interval during which it may be impossible to apply full braking may exceed 0.5 seconds. Thus, it is possible that such a system may bause a collision with another vehicle during that time interval.

An object of this invention is to eliminate the above described drawbacks and to improve skid control devices.

SUMMARY OF THE INVENTION

According to a feature of the invention the above described disadvantages are obviated by effecting skid control operation only when the brakes are applied during travel of the automobile for the purposes of stopping the automobile.

According to another feature of the invention actuating means actuate brake means of the vehicle, control means control the effect of the brake means in dependence upon deceleration of the wheels, and then regulating means respond to the operation of the actuating means to operate, or enable, the control means in response to the operation of the actuating means.

According to another feature of the invention, the actuating means comprises a brake pedal and the master cylinder, while the control means includes the lock detecting device.

According to another feature of the invention, the regulating means includes a switch.

According to another feature of the invention, the control means includes operation means for performing the function of the control means and source means for supplying energy to the operating means. The regulating means then selectively connects and disconnects the source means from the operating means.

According to still another feature of the invention, the regulating means activates the control means only in response to operation of the actuating means beyond a predetermined value indicating an actual braking by the operator.

According to still another feature of the invention, the regulating means includes a switch and the actuating means includes a brake pedal. The switch comprises a first portion mounted on the brake pedal and the second portion spaced from the first portion in the path of the first portion when the brake pedal is moved. Thus, the first portion and the second portion contact each other in response to actual braking.

According to another feature of the invention the control means includes a fluid pump and a fluid control. The wheel regulator means includes a fluid interrupter means between the fluid pump and the fluid control for interrupting the fluid flow in response to operation of the actuating means.

According to still another feature of the invention, the interrupter means includes a monostable fluid control element having an input port and an output port as well as a control port. Switch means responsive to the movement of the pedal causes fluid to enter the control port and constrains fluid flow from the pump through the input port to the output port and the control.

According to another feature of the invention, the switch means includes a drain or leak connected to the pump and the control port for leaking fluid from the control port. A block mounted on the pedal blocks the leak in response to the pedal and forces fluid into the control port.

According to yet another feature of the invention the monostable element includes a cylinder having an input port, an output port, and a control port, and a piston, as well as a spring biasing the piston in the direction of the control port. The piston when biased by the spring toward the control port blocks communication of the input port to the output port. The piston when moved by fluid in the control port against the biasing force of the spring opens communication between the input port and the output port.

By virtue of these features the oil pressure modulating means is not actuated unless the brake pedal is actually depressed for braking by the operator. This is so even if the control means (e.g., the lock detector unit) determines that the wheels are locking or likely to become locked. Thus, when the wheels are rotating idly and suddenly decelerate without depression of the brake pedal, normal braking operation may be effected. Thus, the brake system according to the invention avoids collisions that may occur during false operation of the skid control system and prevents momentary anxiety on the part of the vehicle operators.

According to still another feature of the invention, the regulating means are set to activate the control means for normal braking pressure which an operator applies to respond to normal driving. According to still another feature of the invention the regulating means are set to activate the control means only in response to the hard sudden pressure that occurs when the driver encounters a sudden emergency.

These and other features of the invention are pointed out in the claims. Other objects and advantages of the invention will become obvious from the following detailed description when read in light of the accompanying drawings.

DESCRIPTION OF PREFERRED EMBODIMENTS

Figure 1:
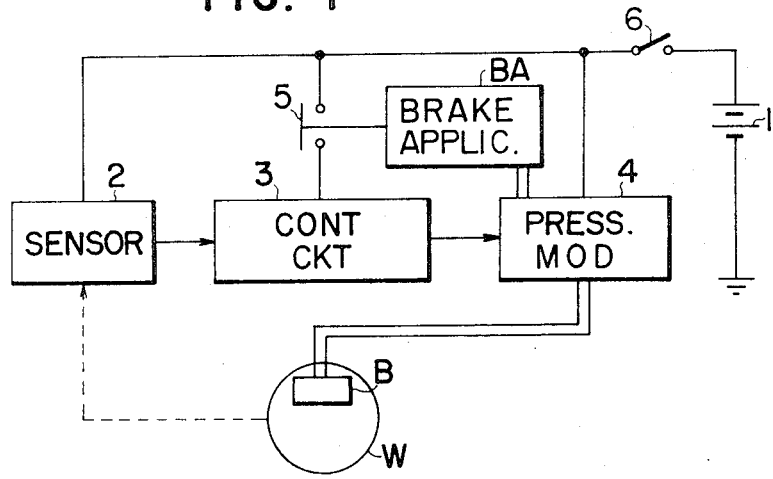
FIG. 1 is a block diagram of a brake system embodying features of this invention.

In the skid control system of FIG. 1 a conventional power source 1, such as a battery, energizes a wheel deceleration sensor 2 and a control circuit 3, as well as an oil or brake fluid pressure modulator 4 through an interlock switch 5 and an automobile ignition switch 6. These elements are all mounted in an automobile to be controlled and form part of its braking system. The control circuit 3 and the sensor 2 form a wheel lock detector. Details of a sensor such as 2, a control circuit such as 3 and a pressure modulator such as 4, as well as their interrelationships are described in the two copending applications of Takeski Ochiai, provisionally accorded Ser. Nos. 109,461 and 109,465, both filed Jan. 25, 1971 and both assigned to the same assignee as the present application.

In FIG. 1 the power source 1 energizes all the components while the sensor 2 functions to detect movement of wheels W. The control circuit 3, upon receiving signals from the sensor 2, determines whether wheels are locking or likely to lock on the basis of changes in the wheel speed and deceleration. The brake fluid pressure modulator 4 controls the hydraulic pressure to the automobile brake cylinders B on the basis of signals received from the control circuit 3. This controls the braking of the vehicle in which the components are mounted. The switch 5 interlocks with a brake actuator BA and closes only when actual braking occurs. That is to say the actuator BA closes interlock switch 5 only when the vehicle's operator depresses the brake pedal beyond a given amount.

The brake actuator BA includes the brake pedal, the master cylinder, and the appropriate brake fluid line to the brake cylinders. According to one embodiment of the invention, the switch 5 is a normally open monostable switch located behind the brake pedal. Thus depressing the pedal beyond a given amount closes the switch. Releasing the pedal opens the switch.

According to another embodiment of the actuator BA the switch 5 interlocks with the hydraulic brake pressure line or master cylinder which responds to the operation of the brake pedal. The switch operates when the pedal causes the pressure in the master cylinder or line to exceed a given pressure.

The ignition switch 6 serves to allow the source 1 to actuate each component. The sensor 2, the control circuit 3 and the oil pressure modulator 4 are connected in cascade so that the signal from one passes to the other in sequence. From the ignition switch 6 the circuit energizing the components branches into three branches. The first branch passes through the sensor 2, the second branch to the control circuit 3 and the third branch to the pressure modulator 4.

As shown in FIG. 1 the sensor 2 and the oil pressure modulator 4 are energized as soon as the ignition switch 6 is turned on. Because the switch 5 normally remains open, turning on of the ignition switch leaves the control circuit 3 disabled. Only when the brake pedal in the actuator BA is depressed a sufficient amount is the switch 5 turned on so that the source 1 can actuate the control circuit 3. With the control circuit 3 thus enabled the latter determines whether or not the wheels are locked or likely to become locked. It thus provides a suitable signal for anti-skid operation to be effected by the oil pressure modulator 4.

As stated, the sensor 2, control circuit 3 and the pressure modulator 4 operate as described in the above mentioned copending applications. However, in FIG. 1 the interlock switch 5 normally disables the control circuit 3 until the brake pedal is pressed for braking operation. It is then that the control circuit 3 is enabled or activated.

The amount beyond the which the brake pedal must be depressed to reach and close the switch 5, or to increase the pressure in the master cylinder or line enough to close the switch 5, is set into the actuator BA. It is determined by the location of switch 5 behind the pedal or by the sensitivity of the switch in the master cylinder or the brake line. According to one embodiment of the invention the amount is set to correspond to ordinary braking for the usual stopping purposes. According to another embodiment the amount is set to correspond to emergency braking when a driver jams onto his brake pedal in a sudden unexpected emergency.

Figure 2:
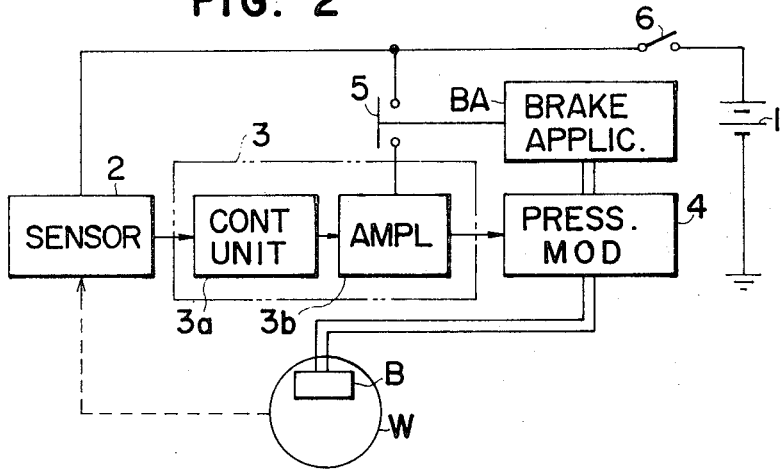
FIG. 2 is a block diagram of another brake system embodying features of the invention.

FIG. 2 illustrates a second embodiment of the skid control system illustrated in FIG. 2, as in FIG. 1, the skid control is of the electrically operated type. In FIG. 2 the skid control system is constructed in a manner similar to system of FIG. 1. The control circuit 3 is, however, divided into two units, a control unit 3a and an output unit 3b. The control unit 3a judges and determines from the wheel movement detected by the sensor 2, whether or not the wheels are locked or likely to become locked. The output unit 3b amplifies the output of the control unit 3a sufficiently to issue an operating signal that both actuates and energizes the oil pressure modulator 4. In FIG. 2 the ignition switch 6 is directly coupled to the control unit 3a so that the source 1 energizes the control unit at all times that the ignition switch is turned on. At the same time the output unit 3b is energized through the interlock switch 5. The switch 5 also enables and disables the oil pressure modulator 4.

In FIG. 2 the sensor 2 and the control unit 3a are energized by the source 1 when the ignition switch 6 is turned on. Thus the sensor 2 and the control unit 3a always sense the condition of the rotation of the wheels. Because the switch 6 is not turned on, no output signal issues from the output unit 3b. Only when the brake pedal is forcibly depressed beyond the given amount to produce braking, is the switch 5 turned on to close the circuit from the output unit 3b to the source 1. This energizes the output unit 3b so that it is prepared for operation. At this time, if the sensor 2 and control unit 3a determine that the wheels are locked or likely to become locked, the output unit 3b amplifies the signals issued from the control unit 3a and passes these signals to the brake fluid pressure modulator 4 so that the latter can perform its anti-skid operation by varying the pressure to the brake cylinder.

In FIG. 2 the output unit 3b constitutes the output amplifier of the control circuit in the beforementioned copending applications. According to another embodiment of FIG. 2 the unit 3b constitutes a separate amplifier cascaded between the control circuit of the copending applications and the pressure modulator. According to yet another embodiment of the invention the pressure modulator is connected in the emitter collector circuit of the amplifier transistor in the output circuit 3b. The switch 5 is then placed in series with the pressure modulator and the emitter-collector circuit of that amplifier transistor. In this way the switch 5 enables both the output unit 3b and the pressure modulator 4 to operate.

In the embodiments described above, those represented by FIG. 2 have the advantage of overcoming any delays which may occur in the control circuit 3 by continuously energizing the control unit 3a. Repeated switching of the supply currents of the control circuit 3, as is done in FIG. 1, may adversely affect the useful life of the control circuit 3. This disadvantage is avoided in the system of FIG. 2 where only the output unit 3b is enabled and disabled to switch the pressure modulator on and off.

Figure 3:
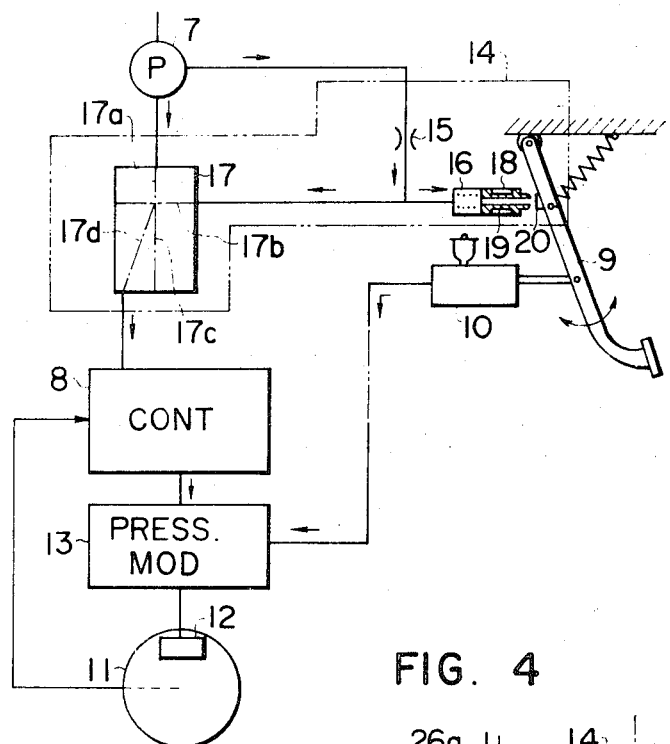
FIG. 3 is a partially schematic, partly sectional, diagram of a system utilizing fluid elements and embodying features of the invention.

Another embodiment of the invention, employing fluid elements, appears in FIG. 3. Here a skid control device utilizes an air pump 7 as an operating source. A control circuit 8 which may be a fluid element control circuit serves as a wheel lock detecting unit. A brake pedal 9 actuates a master cylinder 10 so as to control a wheel 11 with a wheel cylinder 12. A conventional oil pressure modulator serves as a hydraulic braking pressure modulating unit and is connected by fluid lines to the master cylinder 10 as well as to the wheel cylinder 11. The fluid control circuit 8 thus responds to locking or potential locking of the wheel 11 and regulates fluid from the air pump 7 to the oil pressure modulator 13 only when it recognizes that the wheel 11 is locked or is about to lock.

A switch mechanism 14 performs the function of the switch 5 in FIG. 1. That is to say, in FIG. 3 the fluid elements composing the switch 14 serve to enable or disable the fluid control circuit 8. In the switch mechanism 14 a throttle 15 acts as a control or resistor for flow of fluid from the pump 7 to a proximity switch 16 that serves as a fluid drain, as well as to a monostable fluid element 17. The element 17 receives air under pressure from the pump through an entrance port or supply port 17a. It also receives throttled fluid under pressure through a control port 17b from the path formed in part by the throttle 15. The pressurized fluid supplied to the control port 17b is considerably reduced when the proximity switch 16 acts as a drain or leak. The pressure and fluid arriving through the control port is then substantially ineffective. In that case fluid arriving from the air pump 7 to the supply port 17a passes directly out of the monostable element through an output port 17c. When the proximity switch 16 cuts off the drain of fluid passing through the throttle 15, most of the throttled fluid passes through the control port 17b. This switches the fluid element 17 into an "on" state. That is, it constrains the fluid entering the supply port 17a to pass through a second output port 17d to the fluid control circuit 8.

The proximity switch 16 includes a cylinder 18 that carries a longitudinally movable nozzle 19 which is biased to a normal position to the right by an internal spring. The position normally assumed by the nozzle 19 is just beyond, but opposite to a fluid stop 20 mounted on the arm of the brake pedal 9. When the brake pedal 9 is not depressed, a small clearance exists between the movable nozzle 19 and the block 20. In that condition the throttle fluid passing through the throttle 15 leaks out of the lines so that little fluid has an opportunity to build up pressure in the control port 17b. When the control flow to the control port 17b is less than a predetermined value the main jet of the supply port 17a communicates with the output port 17c which represents the shut-off condition.

In general, almost all of the air supplied by the air pump 7 through the throttle resistor 15 leaks out through the clearance between the block 20 and the nozzle 19 of the proximity switch 16 unless the brake pedal is depressed. Since under these circumstances the control flow passed to the conrol port 17b by means of the monostable fluid element is small, air from the air pump 7 communicates with the output port 17 and the switch mechanism 14 is open. This prevents anitskid operation of the system.

The clearance between the block 20 and the movable nozzle 19 is almost fully closed only when the brake pedal 9 is forcibly depressed for actual braking. This may occur during any need to stop the vehicle such as an emergency. Under these circumstances, the air flowing through the throttle 15 is almost completely converted to a control flow and passes to the control port 17b of the monostable fluid element 17. This flow is sufficient to exceed the predetermined value which constrains the main jet entering the supply port 17a to communicate with the output port 17d. The switch mechanism 14 is thus closed or "on." The fluid passing out of the output port 17d thus actuates the fluid element control circuit 8. If at this time the circuit 8 determines that the wheels are locked or likely to become locked the oil pressure modulator 13 is induced to perform its oil pressure modulation and hence its anti-skid control operation.

As soon as the brake pedal 9 is no longer pressed with the force required, it releases the nozzle 19 and allows fluid from the throttle 15 to leak off. This removes the control flow from the control port 17b and the main jet through the supply port 17a passes through the output port 17c. This disables the fluid flow control circuit 8. The anti-skid control operation then ceases. The amount, beyond which the pedal must be depressed is determined in FIG. 3 by the position of switch 16.

The elements of the system in FIG. 3, namely the air pump 7, the monostable fluid element 17, the proximity switch 16, the master cylinder 10, the fluid flow control circuit 8, and the oil pressure modulator 13, may each of themselves be composed of conventionally known devices.

Figure 4:
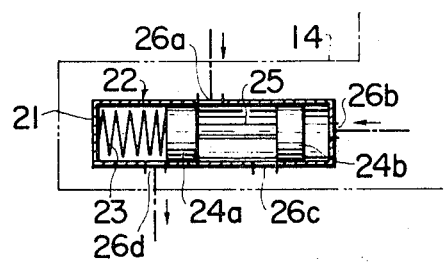
FIG. 4 is a sectional diagram of a spool valve used in another embodiment of the system in FIG. 3.

Still another embodiment of the monostable fluid element of FIG. 3 is illustrated in FIG. 4. Here the remainder of the skid control device has a structure nearly the same as that shown in FIG. 3. However, the switch mechanism 14 utilizes a spool valve 21 instead of the monostable fluid element 17. In the spool valve 21 a valve body 22 encloses a spring 23 which biases a spool 25 having two lands 24a and 24b, slidable in the valve body, toward the right. A port 26a in the spool valve 21 receives air from the air pump 7. A second port 26b receives fluid from the throttle 15 and corresponds to the control port 17b. A third port 16c opens to the atmosphere. A fourth port 26d pipes fluid to the fluid flow control circuit 8.

Under normal conditions when the spring 23 biases the spool 25 to the right and a gap exists between the block 20 and the nozzle 19, the fluid from the throttle 15 leaks off into the gap. Under those circumstances the fluid entering the port 26a from the air pump 7 passes out of the port 26c to the atmosphere. This disables the fluid flow control circuit 8 so the latter exerts no effect upon the oil pressure modulator.

When the block 20 closes off the nozzle 19 because of the forcible depression of the brake pedal 9 during braking, pressure from fluid entering the port 26b pushes the spool 25 to the left against the biasing force of the spring 23. This closes the port 26c and prevents it from communicating with port 26a. At the same time it opens communication between the port 26a and the port 26d. This enables the fluid flow control circuit 8 and initiates skid control operation. When pressure on the brake pedal 9 is released, the reduced pressure at the control port 26 allows the spring 23 to bias the spool 25 to the right. This again closes off the port 26d and reestablishes communication between the ports 26a and 26c. As a result the fluid flow control circuit 8 is disabled.

The selective actuation of the skid control operation only when the brake pedal is forcibly depressed, by the operator, has the effect of eliminating extraneous responses to wheel deceleration. Such extraneous responses may occur upon release of the accelerator, after the wheels in a stationary vehicle have slipped on a slippery or frozen road and been raced. Such rapid deceleration may also occur where gears are shifted from high speed to traveling speed. In such situations the systems disclosed prevent the sensors and control circuits from easing brake pressure with the pressure modulator. They thereby maintain full effective braking even immediately after such non-braking decelerations. The systems thus prevent the momentary mental anxiety which drivers experience when they are unable to brake idly running wheels immediately.

The gap between the block 20 and the nozzle 19 may be adjusted to respond to any degree of braking during which operation of the control 8 is desired.

While embodiments of the invention have been described in detail it will be obvious to those skilled in the art that the invention may be embodied otherwise without departing from its spirit and scope.

What is claimed is:

1. A brake system, comprising brake means associated with a wheel of a vehicle for decelerating the wheel, actuating means coupled to said brake means and operable over a range of values for actuating said brake means, control means responsive to the movement of the wheel for modulating the effect of said brake means on the wheel in dependence upon deceleration of the wheel, and regulating means responsive to operation of said actuating means and coupled to said control means for rendering said control means effective only in response to operation of said actuating means beyond a predetermined value, said control means, including a fluid pump and fluid controlling means, said regulating means including fluid interrupter means between said fluid pump and said fluid controlling means for interrupting fluid flow in response to operation of said actuating means.

2. A system as in claim 1, wherein said regulating means includes a switch, and wherein said actuating means includes a movable brake pedal, said switch including a first portion mounted on said brake pedal and following a path when said pedal is moved and a second portion spaced from said first portion in the path of said first portion so as to be contacted by said first portion when said brake pedal is moved.

3. A system as in claim 1, wherein said actuating means includes a brake line, and said regulating means includes a switch mounted in said brake line to respond to the pressure of said brake line when the pressure exceeds a predetermined value.

4. A system as in claim 1, wherein said interrupter means includes a monostable fluid control element having an input port communicating with said pump and an output port communicating with said fluid controlling means as well as a control port for responding to fluid flow by constraining said input port to communicate with said output port, and switch means responsive to said actuating means for applying fluid to said control port.

5. A system as in claim 4, wherein said switch means includes a drain communicating with said pump and said control port for draining fluid from said control port and further including a block mounted on said actuating means for blocking said drain in response to operation of said actuating means in excess of the predetermined value.

6. A system as in claim 5, wherein said actuating means includes a brake pedal movable along a given path, and wherein said pedal when moved in said path moves said block relative to said drain and constrains said block to block said drain.

7. A system as in claim 4, wherein said fluid interrupter means includes a cylinder having said ports and a piston as well as a spring biasing said piston in the direction of said control port, said piston when biased by said spring toward said control port blocking communication of said input port to said output port, said piston being movable by fluid pressure in said control port against the bias of said spring and when so moved opening communication between said input port and said output port.

8. A brake system, comprising brake means associated with a wheel of a vehicle for decelerating the wheel, actuating means coupled to said brake means and operable over a range of values for actuating said brake means, control means responsive to the movement of the wheel for modulating the effect of said brake means on the wheel in dependence upon deceleration of the wheel, and regulating means responsive to operation of said actuating means and coupled to said control means for rendering said control means effective only in response to operation of said actuating means beyond a predetermined value, said actuating means including a brake pedal, said regulating means including a switch mounted in the path of said brake pedal to respond to movement of the brake pedal beyond a predetermined distance, said control means including a fluid pump and fluid controlling means, said regulating means including fluid interrupter means between said fluid pump and said fluid controlling means for interrupting fluid flow in response to operation of said actuating means.

9. A system as in claim 8, wherein said interrupter means includes a monostable fluid control element having an input port communicating with said pump and an output port communicating with said fluid controlling means as well as a control port for responding to fluid flow by constraining said input port to communicate with said output port, and switch means responsive to said actuating means for applying fluid to said control port.

10. A system as in claim 9, wherein said switch means includes a drain communicating with said pump and said control port for draining fluid from said control port and further including a block mounted on said actuating means for blocking said drain in response to operation of said actuating means in excess of the predetermined value.

11. A system as in claim 10, wherein said actuating means includes a brake pedal movable along a given path, and wherein said pedal when moved in said path moves said block relative to said drain and constrains said block to block said drain.

12. A system as in claim 9, wherein said fluid interrupter means includes a cylinder having said ports and a piston as well as a spring biasing said piston in the direction of said control port, said piston when biased by said spring toward said control port blocking communication of said input port to said output port, said piston being movable by fluid pressure in said control port against the bias of said spring and when so moved opening communication between said input port and said output port.

* * * * *